Nov. 17, 1953    C. A. HEILAND    2,659,859
METHOD OF AND APPARATUS FOR AEROMAGNETIC PROSPECTING
Filed April 5, 1946    4 Sheets-Sheet 1

*INVENTOR:*
Carl A. Heiland
BY
Davis, Lindsey, Smith & Shonts,
Attorneys

Nov. 17, 1953  C. A. HEILAND  2,659,859
METHOD OF AND APPARATUS FOR AEROMAGNETIC PROSPECTING
Filed April 5, 1946  4 Sheets-Sheet 2

INVENTOR:
Carl A. Heiland
BY
Davis, Lindsey, Smith & Shonts,
Attorneys

Nov. 17, 1953  C. A. HEILAND  2,659,859
METHOD OF AND APPARATUS FOR AEROMAGNETIC PROSPECTING
Filed April 5, 1946  4 Sheets-Sheet 4

*Inventor:*
Carl A. Heiland
By
*Davis, Lindsey, Smith & Shonts,*
Attorneys

Patented Nov. 17, 1953

2,659,859

UNITED STATES PATENT OFFICE 2,659,859

METHOD OF AND APPARATUS FOR AEROMAGNETIC PROSPECTING

Carl A. Heiland, Denver, Colo.

Application April 5, 1946, Serial No. 659,996

4 Claims. (Cl. 324—43)

This invention relates to improvements in methods of and apparatus for aeromagnetic prospecting and its purpose is to provide means carried by an airplane in flight for indicating and recording magnetic anomalies produced by subsurface geologic structures with which deposits of oil and other minerals are associated.

It has heretofore been the practice to survey magnetic anomalies by apparatus called magnetic balances, that is, instruments in which magnetic intensities are measured by comparison with gravity, but the operation of these instruments requires a reasonably firm foundation and their use has therefore been confined to places where they are supported by solid land.

Obviously, an apparatus and procedure which would make possible the taking of magnetic measurements from the air would not only speed up greatly magnetic prospecting operations on land but would have the additional advantage of permitting surveys to be made over inaccessible areas, such as jungles, lakes, coastal waters and the like. In an earlier publication [Transactions of the American Institute of Mining and Metallurgical Engineers, Geophysical Prospecting, 1932, pages 213 and 214] I described briefly a method of making magnetic measurements in an airplane according to which an earth inductor was rotated at constant speed and oriented into the direction of the magnetic meridan by another earth inductor. Since that time, the development of electronic circuits, recording mechanisms, magnetic alloys and aircraft instruments has made possible considerable improvement in the method suggested in said publication and the present invention is directed to a new method and apparatus embodying such improvements and involving a new and improved mode of operation.

One object of the present invention is to provide a magnetic indicating and recording system controlled by an earth induction compass of the type known as a "flux gate" which may be installed on one wing of an airplane in such manner as to orient an earth indicator, mounted on the other wing of the airplane, automatically and continuously into the direction of the magnetic vector. A further object is to provide an improved method and apparatus for aeromagnetic prospecting and mapping with the use of an earth inductor which is driven at a high, but not necessarily constant, speed preferably by an air turbine actuated by the vacuum system usually provided in the modern airplane. Another object is to provide a system of the type referred to comprising a rotary inductor arranged to have its output continuously compensated by an auxiliary magnetic field which is equal and opposite to the one being measured. Still another object is to provide an aeromagnetic prospecting and mapping system by the use of a continuously rotating earth inductor which has its output neutralized by an auxiliary field supplied through a rheostat actuated by a servo mechanism, the position of the rheostat drive being continuously recorded. Other objects relate to various features of construction and arrangement and to novel features of the improved method.

The nature of the invention will be understood from the following specification taken with the accompanying drawings in which one embodiment of the improved apparatus and carrying out the improved method, and certain modifications thereof, are illustrated. In the drawings, Figure 1 shows, somewhat schematically, apparatus embodying the present invention and applied to an amphibian airplane which is illustrated in top plan view;

Figure 1:
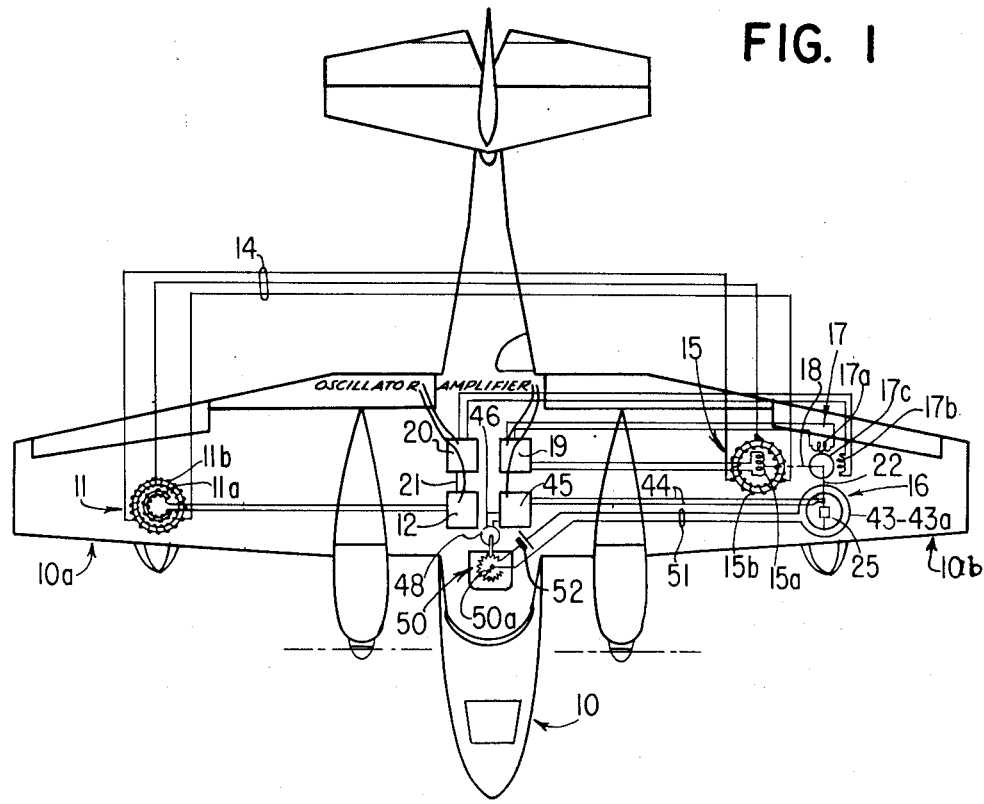
Figure 2:
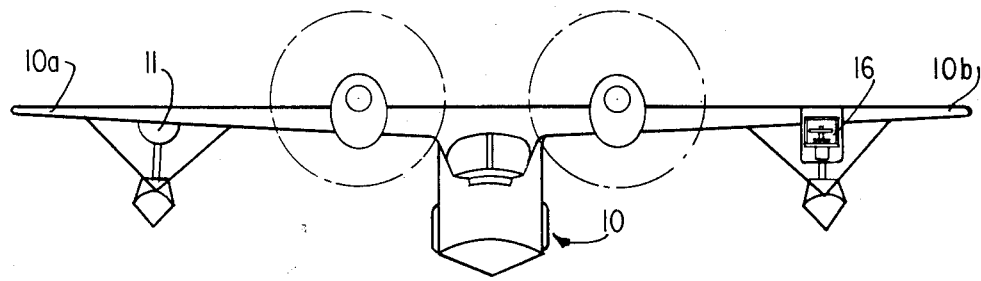
Fig. 2 shows a front elevation of the airplane illustrated in Fig. 1, with a portion of the apparatus of the present invention diagrammatically illustrated.

In the accompanying drawings there is shown in Fig. 1 an airplane 10 of the amphibian type having mounted in the right wing 10a thereof a compass of the flux gate type comprising a meridian transmitter 11 which has its exciting winding 11a of toroidal form supplied with electrical oscillations of a certain frequency $f$ by an electronic oscillator 12. The secondary of the meridian transmitter 11 consists of a toroidal winding 11b which is tapped at three equally spaced points to form three coil sections in which are induced voltages which are proportional to the direction of the magnetic vector during the travel of the plane. These voltages are transmitted by the triple conductors 14 to a receiving device 15 which is mounted in the left wing 10b of the plane. This receiving device also has a toroidal secondary winding 15b which is tapped at three equally spaced points for connection with the conductors 14. The secondary winding of the receiving device is in the form of a rotor 15a which may be so oriented that no voltage will be induced in it. It is thus possible to employ the receiving device 15 to transmit the magnetic meridian to the detecting device 16 comprising the rotary inductor heretofore referred to.

This is accomplished through the use of a servo-motor 17 provided with two stator windings 17a and 17b and a rotor 17c which is mechanically coupled with the rotor 15a of the receiving device by a linkage illustrated diagrammatically at 18. The winding 17a is connected to the output stage of an amplifier 19 the input of which is connected to the winding of the rotor 15a. The other stator winding 17b of the servo-motor 17 is connected to an electronic oscillator 20 which is loosely coupled to the oscillator 12, as shown at 21, and transmits to the servo-motor a frequency $f1$ which is twice that of the oscillator 12.

The servo-motor 17 transmits its rotary motion to the detecting device 16 through a mechanical connection shown diagrammatically at 22. The primary element of the detecting device is a rotary inductor coil 25 which is constantly rotated when the plane is in motion by an air turbine 26 and which is so controlled by the servo-motor 17 through the system just described that the axis of rotation of the coil 25 is always horizontal and located in the plane of the magnetic meridian, whereby voltages taken off from the terminals of the coil 25 are proportional to the vertical component of the earth's magnetic force.

Figure 3:
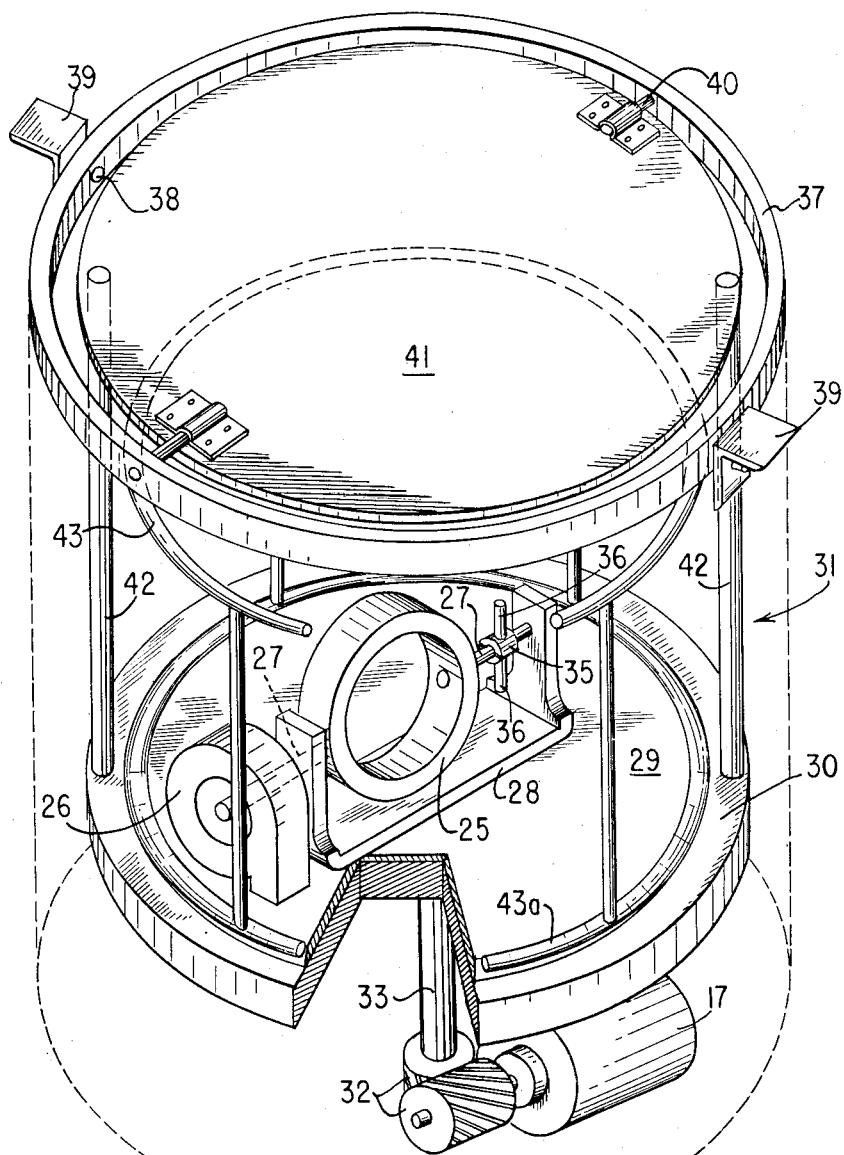
Fig. 3 shows a perspective view of the detector device which is embodied in the prospecting and mapping system shown in Fig. 1.

The construction of the detecting device 16 is shown particularly in Fig. 3 where the coil 25, made up of a large number of turns of fine copper wire, is mounted in balanced position on two stub shafts 27 which are journalled in the upwardly extending arms of a U-shaped bracket 28. This bracket is secured upon a circular plate 29 which is mounted for rotation on the base plate 30 of a gimbal frame 31. The meridian motor 17 is mounted on the under side of the base plate 30 and its shaft is connected through gears 32 with an axially located shaft 33 which is journalled in the plate 30 and connected to the middle point of the plate 29, thus forming the driving connection which is shown diagrammatically at 22 in Fig. 1. One of the shafts 27 has mounted thereon a commutator 35 comprising two segments separated by insulating material and engaged by brushes 36 which are connected in the circuit hereinafter described. The other stub shaft 27 is connected to the air turbine 26 so that the coil is thereby rotated when the airplane is in motion.

In order to obtain the requisite accuracy in the measurement of the vertical magnetic intensity, it is necessary to suspend the detector unit 16 in the airplane in such a manner that the axis of rotation of the coil 25 is horizontal at all times. For this purpose, the top ring 37 of the gimbal frame 31 is pivotally attached on opposite sides by pins 38 to brackets 39 which are secured to suitable parts of the airplane structure. The ring 37, in turn, supports by pivot pins 40, located in a plane at right angles to the plane of the pins 38, the circular top plate 41 which is rigidly connected to the bottom plate 30 by the spacing rods 42. In this way, the supporting frame of the coil 25 is suspended for movement about two right-angularly disposed axes.

To neutralize the field producing induced currents in the rotating coil 25, two compensator coils 43 and 43a are mounted in the frame 31 in concentric relationship to the axis of rotation of the plate 29 and in symmetrical spaced relation to the axis of rotation of the coil 25. These compensator rings are automatically supplied with current for counteracting the instantaneous vertical component of the magnetic field with an equal and opposite auxiliary magnetic field in such a way that the voltage induced in the coil 25 always tends to be zero. The voltage induced in the coil 25 is transferred by the conductors 44 to an amplifier 45 which steps up the output of the rotating coil and operates through the conductors 46 to drive a servo-motor 48 from which a mechanical driving connection extends to a rheostat 50. The rheostat is connected through conductors 51 and a battery 52 to the compensator coils 43 and 43a to supply a compensating current thereto for counteracting and neutralizing the voltage induced in the coil 25 by the magnetic field. The movable contact 50a of the rheostat is preferably connected to the recording stylus of a recording mechanism so that a continuous record of the variations in the vertical component of the magnetic field may be made during the flight of the airplane.

Figure 4:
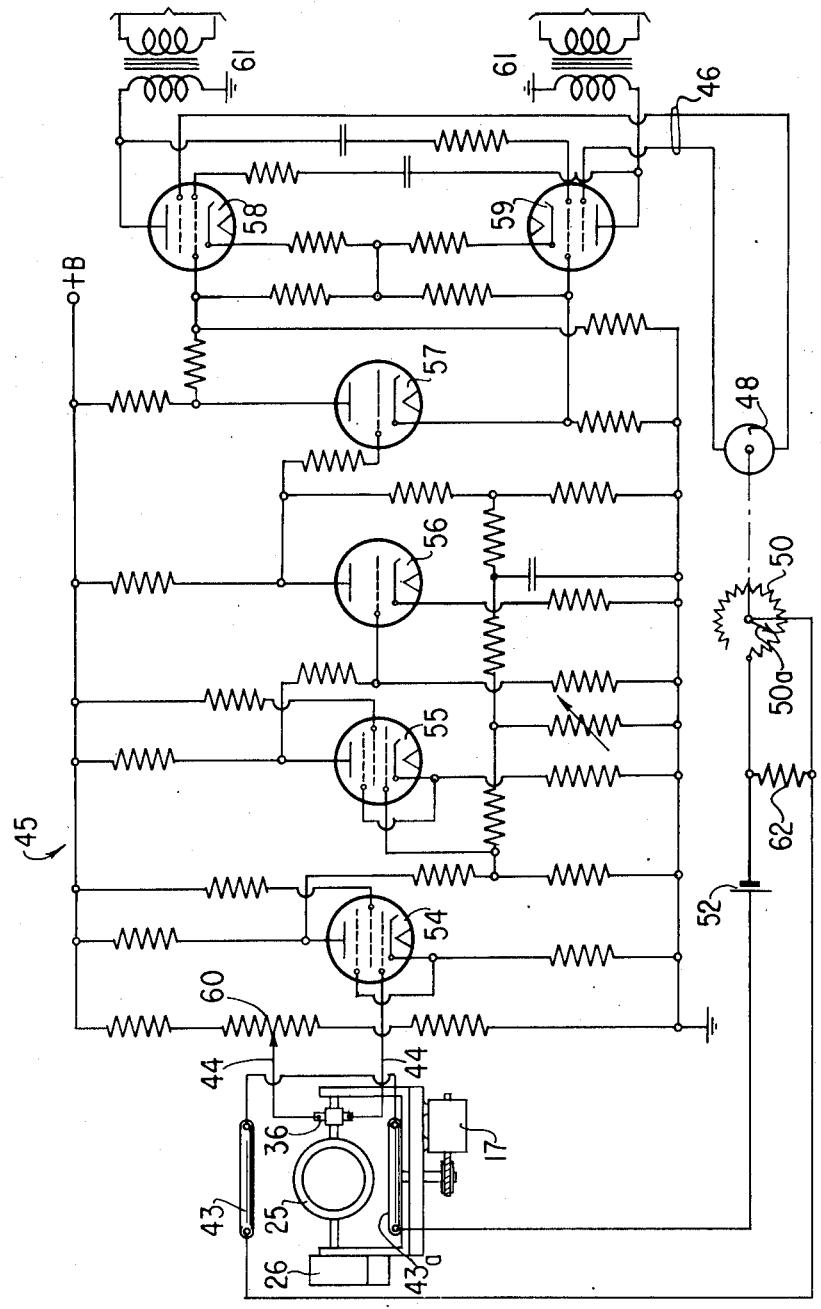
Fig. 4 shows diagrammatically one form of electronic circuit embodying the features of the present invention.

The method of measuring the intensity of the vertical component of the magnetic field will be further apparent from an inspection of Fig. 4 in which the circuit connections of the coil 25, the compensator rings 43 and 43a, the amplifier 45 and the rheostat 50 are shown. The amplifier 45 comprises two pentode tubes 54 and 55 and two triode tubes 56 and 57, the latter tube 57 operating as a phase splitter to feed current to the two thyratron tubes 58 and 59. The output of the rotating coil 25 is fed by one of the conductors 44 to the grid of the first stage tube 54 and the other conductor 44 is adjustable on the resistance 60 for the purpose of obtaining the desired zero setting. The two thyratron tubes 58 and 59 are connected through transformers 61 with sources of alternating current supply and the grids of these two tubes are connected by the previously mentioned conductors 46 with the servomotor 48 by which the rheostat 50 is driven. The battery 52 supplies a constant current, corresponding to the major portion of the vertical component of the magnetic intensity to be compensated, through the resistor 62.

In the operation of the apparatus described above it will be apparent that voltages proportional to the direction of the magnetic vector are induced in the three coils of the meridian transmitter 11 and that the receiving device 15, which has a secondary capable of being so oriented that no voltage is induced in it, operates through the servo-motor 17 to move the coil 25 at all times toward a position wherein its axis of rotation is in the plane of the magnetic meridian, whereby the voltage taken off the brushes 36 will be proportional to the vertical component of the magnetic field of the area beneath the airplane. When the voltage induced in the inductor coil 25 causes a signal to be received by the amplifier 45, the servo-motor 48 automatically adjusts the rheostat 50 to cause the signal to be neutralized by an opposing magnetic field matching the intensity of the vertical component of the earth's magnetic field at that particular location. The movements of the contact arm 50a of the rheostat thus indicate the vertical components of the magnetic intensities in different parts of an area under investigation and, by connecting the arm with a recording device, these intensities or the anomalies of the area may be continuously recorded during the flight of the airplane.

Figure 5:
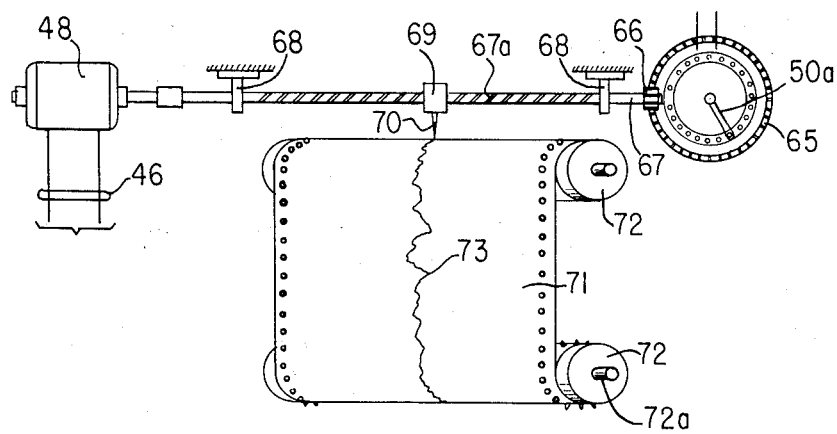
Fig. 5 is a view, partially in perspective, showing a recording device actuated by the movable arm of the rheostat to make a continuous record.

One method of connecting the rheostat with the servo-motor 48 and actuating a recorder by the movable contact arm of the rheostat is shown in Fig. 5 where the arm 50a is illustrated as being attached to a ring gear 65 which rotates with the arm and actuates a small gear 66 fixed on the end of a shaft 67 journalled in bearings 68. This shaft is driven by the servo-motor 48 and has a helical thread or groove 67a which is engaged by a pin mounted in a block 69 slidably mounted on the shaft 67 and carrying a pen or stylus 70. This pen or stylus is arranged to engage the surface of a record sheet 71 which travels on spaced rollers 72, one of which is positively driven by a motor or the like connected to its shaft 72a. The rollers have pins or sprockets which engage holes in the margin of the record sheet which is thus driven with uniform speed. Then as the arm 50a moves in response to changes in the magnetic intensity, the pen or stylus 70 partakes of a corresponding movement and traces a permanent graph or record 73 on the record sheet.

Figure 6:
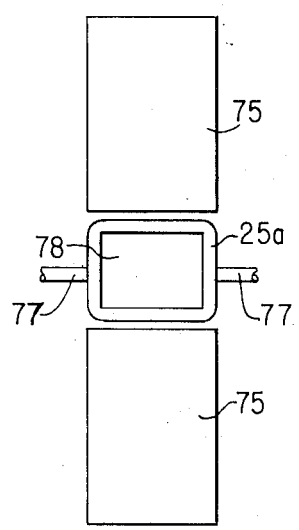
Fig. 6 shows a front elevation of a modification of a part of the detector device shown in Fig. 3, whereby an increased electrical output of the inductor is produced.
Figure 7:
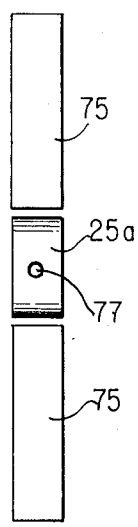
Fig. 7 is an end elevation of the device illustrated in Fig. 6.

An alternate construction of the detector unit 16, providing for greater electrical output, is shown in Figs. 6 and 7. In this modification, two bars 75 of high magnetic permeability are mounted above and below the rotary inductor coil 25a which corresponds to the inductor coil 25 previously described but is preferably of rectangular form instead of being circular. This coil 25a is mounted on shafts 77 one of which is driven in the same manner as one of the shafts 37 by which the coil 25 is carried and the bars 75 have the effect of collecting the lines of force of the earth's magnetic field, thereby increasing the strength of the field in which the coil 25a rotates. The bars 75 may be mounted on the plates 29 and 41. To reduce the air gap between the bars, the coil 25a is preferably provided with a core 78 formed of the same material as that from which the bars 75 are constructed. By selecting a suitable highly permeable material for the bars 75 and the core 78, such as "Permalloy" or "Hypernik," the permeability of which is high in small fields, such as that of the earth, the effective electromotive force created by the rotation of the detector coil is substantially increased.

Although one form of the improved apparatus, and modifications of certain portions thereof, have been shown and described in connection with the disclosure of one example of the improved method of aeromagnetic prospecting, it will be understood that both the apparatus and the method may be modified in various ways without departing from the scope of the appended claims.

I claim:

1. The method of aeromagnetic prospecting which comprises the steps of moving an earth inductor with an airplane in flight, continuously actuating said inductor to move its axis into the plane of the magnetic meridian, rotating said inductor, and continuously compensating the action upon said inductor of the magnetic field under investigation by an auxiliary magnetic field of equal magnitude and opposite direction responsive to voltages produced in said inductor.

2. The method of aeromagnetic prospecting which comprises the steps of moving an earth inductor with an airplane in flight, continuously actuating said inductor to move its axis into the plane of the magnetic meridian, rotating said inductor, continuously compensating the action upon said inductor of the magnetic field under investigation by an auxiliary magnetic field of equal magnitude and opposite direction responsive to voltages produced in said inductor, and measuring the magnitude and variation of said auxiliary magnetic field.

3. The combination in apparatus mounted on an airplane for aeromagnetic prospecting, of an earth inductor compass, a receiving device actuated by the voltages induced in said inductor compass and having a rotor adapted to be oriented into the plane of the earth's magnetic meridian, a rotary inductor, means for rotating said inductor continuously, a servo-motor actuated by said rotor of said receiving device and arranged to orient said rotary inductor continuously toward a position wherein its axis of rotation is in the plane of the earth's magnetic meridian, means for setting up a compensating magnetic field in the region of said rotary inductor in opposition to the vertical component of the earth's magnetic field, and means responsive to the voltages induced in said rotary inductor by said vertical component for continuously regulating the magnitude of said compensating field.

4. The combination in apparatus mounted on an airplane for aeromagnetic prospecting, of an earth inductor compass, a receiving device actuated by the voltages induced in said inductor compass and having a rotor adapted to be oriented into the plane of the earth's magnetic meridian, a rotary inductor, means for rotating said inductor continuously, a servo-motor actuated by said rotor of said receiving device and arranged to orient said rotary inductor continuously toward a position wherein its axis of rotation is in the plane of the earth's magnetic meridian, means for setting up a compensating magnetic field in the region of said rotary inductor in opposition to the vertical component of the earth's magnetic field, means responsive to the voltages induced in said rotary inductor by said vertical component for continuously regulating the magnitude of said compensating field, and means for indicating and recording changes in said compensating magnetic field.

CARL A. HEILAND.

References Cited in the file of this patent

UNITED STATES PATENTS

| Number | Name | Date |
|---|---|---|
| Re. 15,597 | Brewer | May 15, 1923 |
| 1,988,521 | Sperry et al. | Jan. 22, 1935 |
| 2,151,627 | Vacquier | Mar. 21, 1939 |
| 2,172,064 | Harrison | Sept. 5, 1939 |
| 2,338,991 | Arnold | Jan. 11, 1944 |
| 2,361,433 | Stuart | Oct. 31, 1944 |
| 2,376,883 | Riggs et al. | May 29, 1945 |
| 2,406,870 | Vacquier | Sept. 3, 1946 |
| 2,421,583 | Stuart | June 3, 1947 |
| 2,446,939 | MacCallum | Aug. 10, 1948 |

OTHER REFERENCES

Transactions, American Institute of Mining and Metallurigcal Engineers, Geophysical Prospecting, 1932, pp. 213–214.